March 8, 1966  B. L. BUDZYN  3,238,802
CONSTANT LENGTH CHAIN ADJUSTABLE ROLLER DRIVE
Filed Dec. 18, 1963  5 Sheets-Sheet 1

INVENTOR.
BOLESLAW L. BUDZYN
BY Polachek & Saulsbury
ATTORNEYS

March 8, 1966

B. L. BUDZYN 3,238,802

CONSTANT LENGTH CHAIN ADJUSTABLE ROLLER DRIVE

Filed Dec. 18, 1963

INVENTOR.
BOLESLAW L. BUDZYN
BY
Polachek & Saulsbury
ATTORNEYS

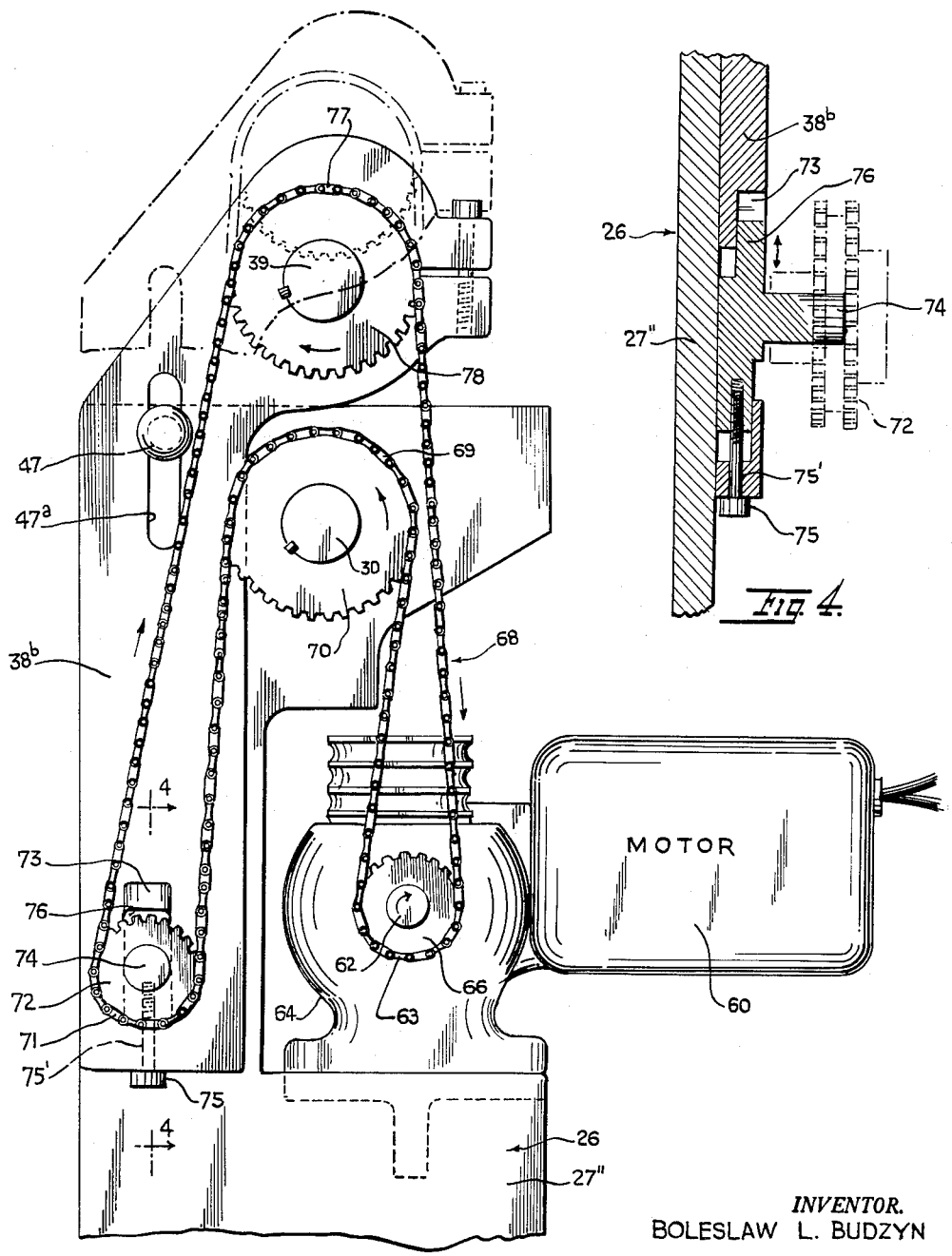

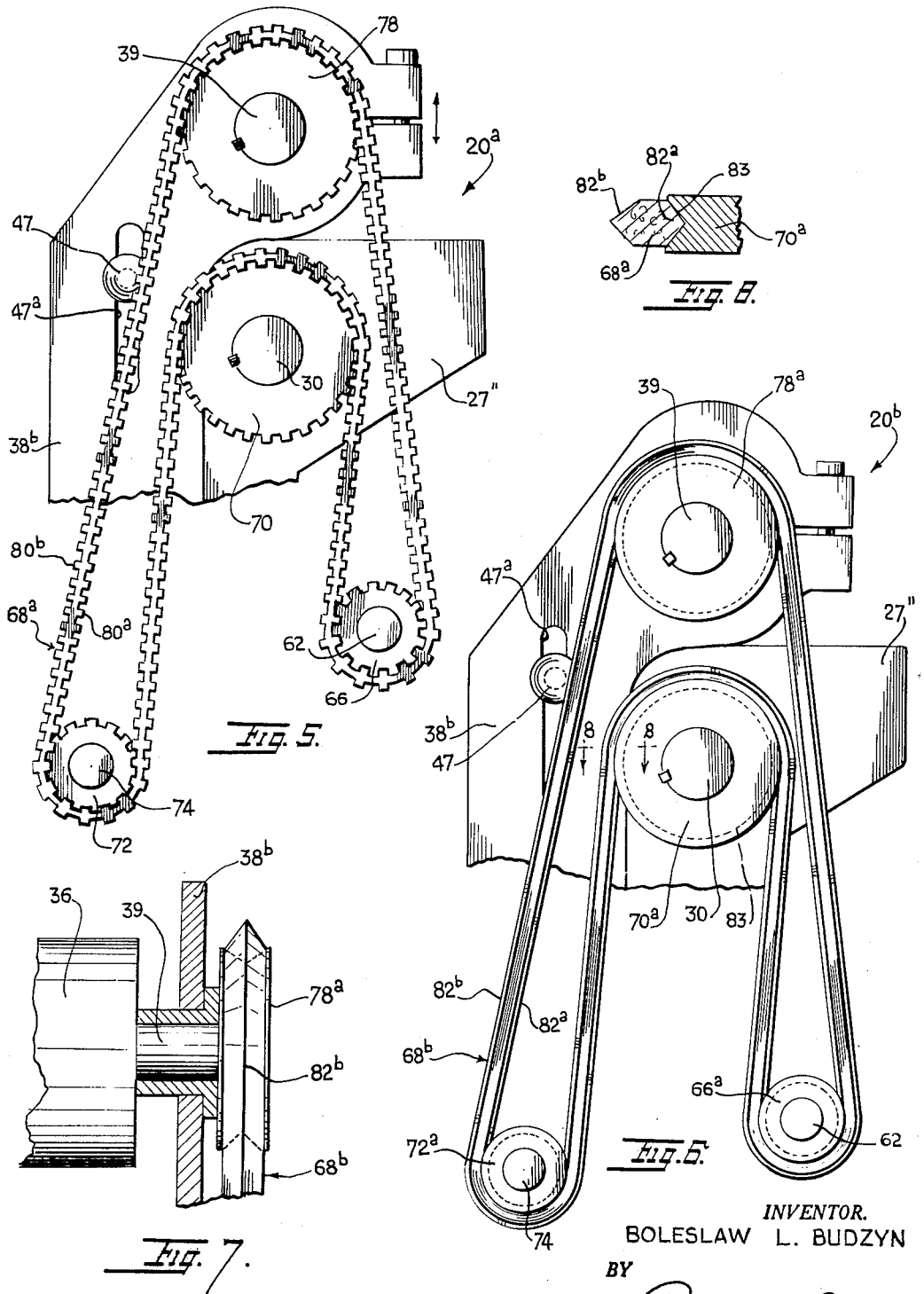

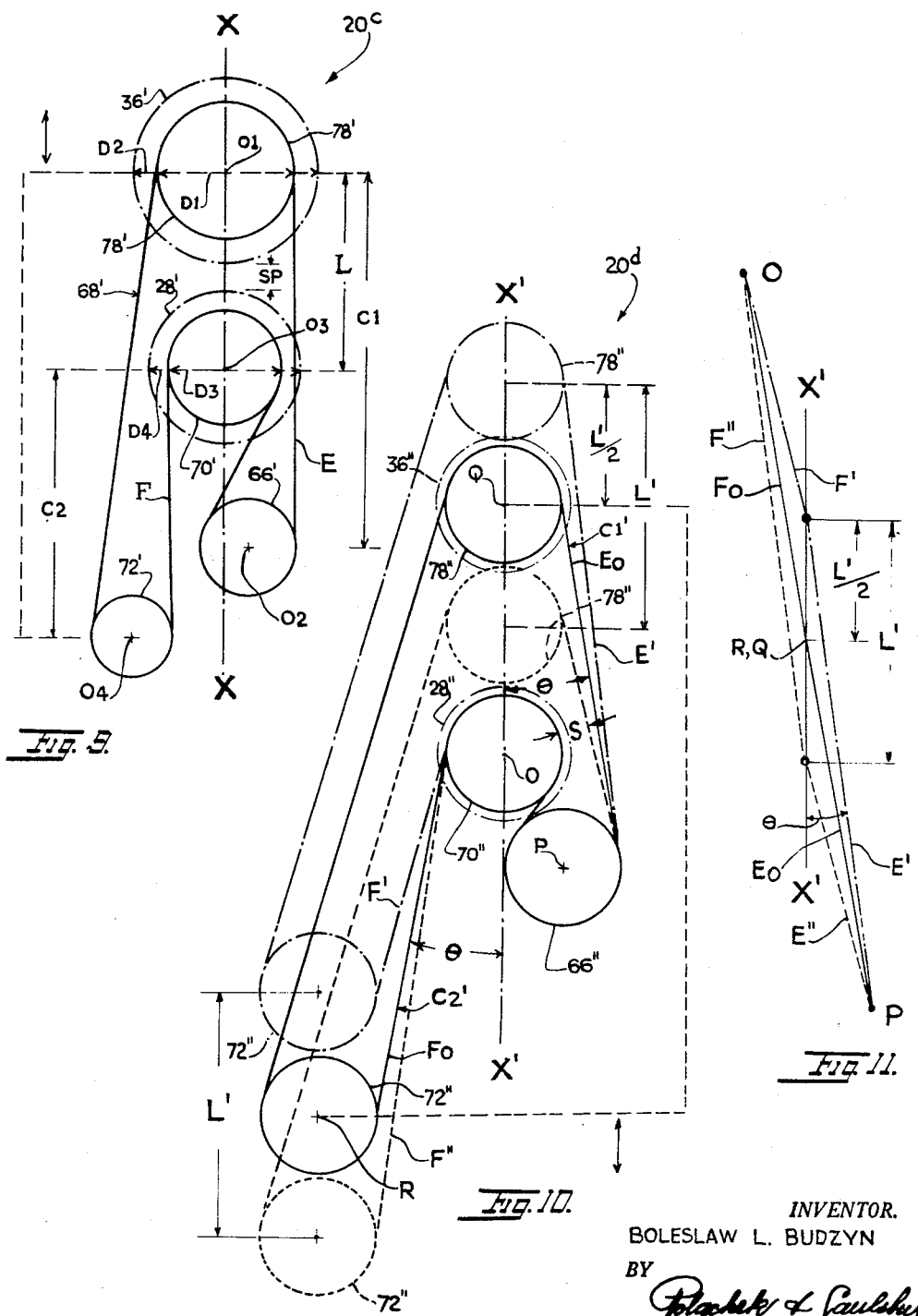

United States Patent Office 3,238,802
Patented Mar. 8, 1966

3,238,802
CONSTANT LENGTH CHAIN ADJUSTABLE
ROLLER DRIVE
Boleslaw L. Budzyn, 63 Poplar St., Passaic, N.J.
Filed Dec. 18, 1963, Ser. No. 331,567
8 Claims. (Cl. 74—219)

This invention relates to a mechanical system for driving pressure and feed rollers, and more particularly concerns an endless chain or belt drive mechanism for a pair of adjustably spaced, axially parallel rollers, with means for maintaining positive drive of both rollers at all spaced positions of the rollers.

According to the invention there are provided relatively fixed and movable supports. On the respective supports are rotatably journaled two cylindrical rollers in axially parallel horizontal positions. On the movable support carrying one of the rollers is journaled an idler sprocket or pulley. Other sprockets or pulleys are mounted on shafts carrying the rollers. A drive sprocket or pulley is carried on a shaft driven by a motor. An inelastic endless chain or belt is entrained in a reentrant configuration on the sprockets or rollers for driving both rollers simultaneously. The movable support is provided with means for adjusting the lateral or radial spacing between the rollers. The chain or belt is so arranged on the sprockets or pulleys that in all positions of adjustment of the spacing between the rollers, the rollers are both positively driven by the motor via the chain or belt. The present invention has general application wherever two spaced rollers or shafts must be adjustably spaced and directly driven by a chain or belt without change in drive tension or slippage between the rollers or shafts and the chain or belt. The invention makes it possible to eliminate complex clutches, transmission systems and the like between a drive motor and two driven shafts.

It is therefore one object of the invention to provide a mechanical system including two adjustably spaced axially parallel rollers both positively driven by an endless drive chain or belt, with means for adjusting lateral spacing between the rollers without change in tension of the chain or belt and without slippage between the chain or belt and the driven rollers.

A further object is to provide an endless drive chain or belt for rollers in a system as described, wherein the chain or belt is entrained on an assemblage of sprockets or pulleys which are changed in relative positions when the spacing between the rollers is changed to maintain positive drive of the rollers by the chain or belt.

Another object is to provide a mechanical system as described wherein the rollers have equal or different diameters.

Still another object is to provide a mechanical system as described including a worm and worm wheel mechanism for changing the spacing of the rollers.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 3 is an end elevational view of the apparatus taken on line 3—3 of FIG. 2.

FIG. 4 is a fragmentary further enlarged sectional view taken on line 4—4 of FIG. 3.

FIG. 5 and FIG. 6 are fragmentary sectional views each similar to a portion of FIG. 3, showing different drive mechanisms.

FIG. 7 is a fragmentary sectional view similar to a portion of FIG. 2, of the mechanism of FIG. 6.

FIG. 8 is an enlarged fragmentary sectional view taken on line 8—8 of FIG. 6.

FIGS. 9–11 are diagrams of different mechanical systems use in explaining the invention.

Figure 1:
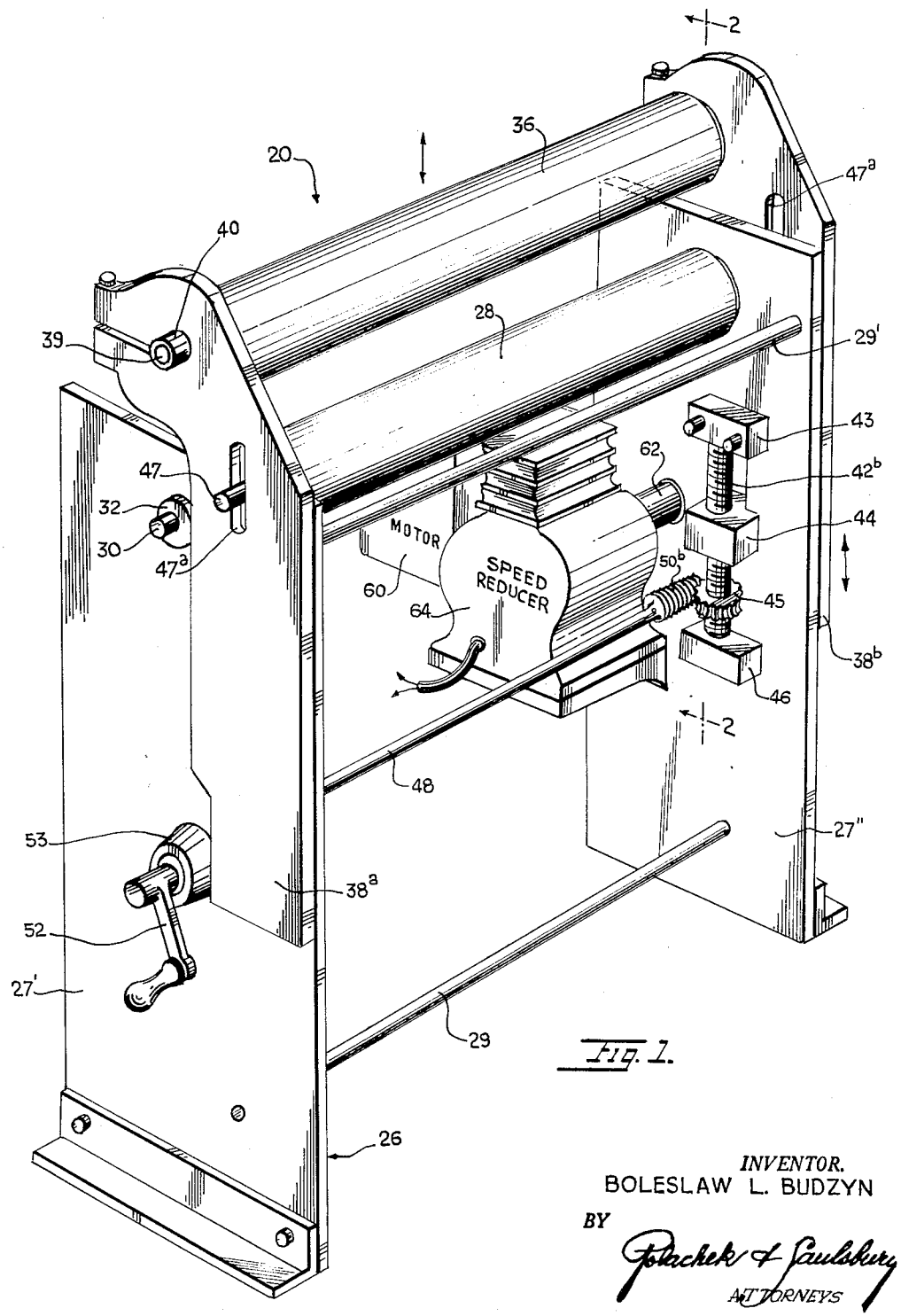
FIG. 1 is a perspective view of apparatus including a mechanical system embodying the invention.
Figure 2:
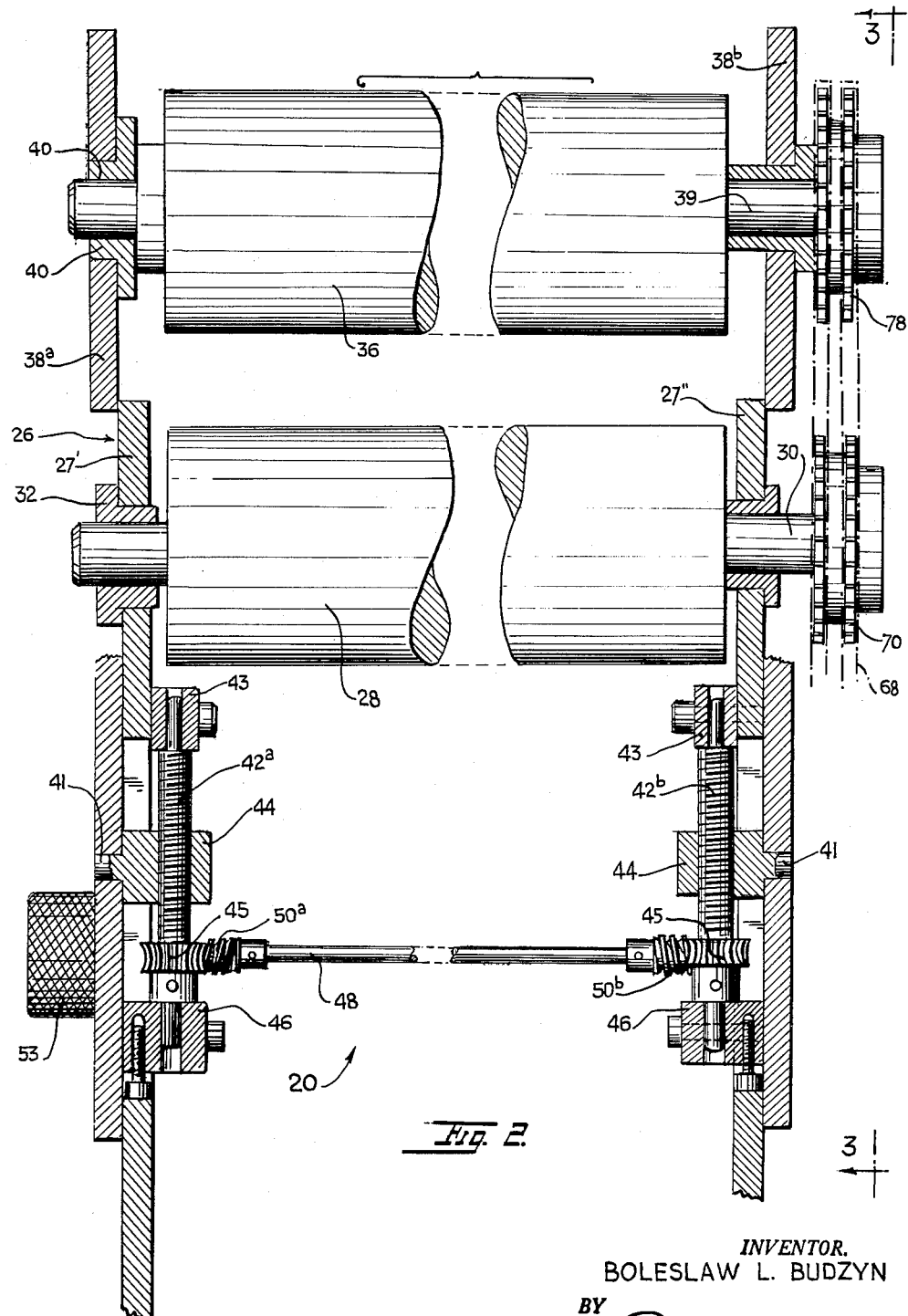
FIG. 2 is an enlarged vertical sectional view taken on line 2—2 of FIG. 1, parts being broken away.

Referring first to FIGS. 1–4, there is shown apparatus 20 including a frame 26 having two spaced parallel plates 27', 27" joined by rods 29, 29'; see FIGS. 1 and 2. A first axially horizontal drive roller 28 is rotatably carried by a shaft 30 engaged in bearings 32 at opposite sides of the frame. A second axially horizontal drive roller 36 is carried by two vertical plates 38$^a$, 38$^b$ at opposite sides of frame 26. This roller has shaft 39 engaged in bearings 40 in the plates as best shown in FIGS. 1 and 2. Roller 36 is mounted directly above roller 28 and can be adjusted in elevation with respect to roller 28.

A pair of axially vertical screws 42$^a$, 42$^b$ have their upper ends rotatably engaged in sleeves 43 secured to inner sides of frame 26. The screws extend through nuts 44 secured to plates 38$^a$, 38$^b$ by pins 41. Worm gears 45 are located at the lower ends of screws 42$^a$, 42$^b$, and bottom ends of the screws are rotatably engaged in bearings 46 secured to inner sides of the frame 26. A horizontal shaft 48 carrying spaced worms 50$^a$, 50$^b$ passes through opposite sides of the frame 26. The worms are engaged with worm gears 45, respectively.

A crank 52 can be engaged on one end of the shaft 48 in hub 53 as best shown in FIG. 1, for turning the shaft. The crank is removed from hub 53 in FIG. 2. When the shaft 48 is turned by crank 52, the screws 42$^a$, 42$^b$ are turned via the worm gears 45 and the nuts 44 move vertically up or down depending on the direction of turning of the crank. Thus the plates 38$^a$, 38$^b$ and roller 36 are adjusted in elevation. Frame 26 has guide pins 47 engaged in slots 47$^a$ in plates 38$^a$, 38$^b$. Due to the worm and worm gear arrangement, the axis of roller 36 will remain in fixed position once it is set by turning the crank 52. The crank can be removed after the roller 36 is adjusted to a desired spacing from roller 28.

In order to drive the rollers 28, 36, there is provided a motor 60. This motor drives a shaft 62 through a speed reducing gear train in gear box 64 on frame 26. Shaft 62 carries a sprocket 66 around which is entrained a first loop 63 of an endless chain 68. The chain, as best shown in FIG. 3, has a second loop 69 engaged over a sprocket 70 at one end of roller shaft 30, which extends beyond plate 38$^b$. A third chain loop 71 is engaged around a sprocket 72 on stub shaft 74 carried by plate 38$^b$. Shaft 74 is adjustably positioned in elevation on plate 38$^b$ by a screw 75 engaged with a small plate 76 movable in guide slot 73 and integral with shaft 74; see FIGS. 3 and 4. Chain 68 has a fourth loop 77 engaged on a sprocket 78 mounted on one end of roller shaft 39 at plate 38$^b$.

It will thus be apparent that when roller 36 and plates 38$^a$, 38$^b$ are adjusted up or down by turning of crank 52, the chain loops 71 and 77 move up or down correspondingly with respect to the loops 63 and 69 which are fixed in elevation. By these means, the chain traverse adjusts to the changing elevation of roller 36. Screw 75 can be turned in threaded hole 75' in plate 38$^b$ to adjust the tension in the chain between the sprocket 72 and roller sprockets 69, 78 if this should be necessary.

Instead of employing a chain of individual links as shown by chain 68 in FIG. 3, there may be provided an endless belt 68$^a$ as shown in apparatus 20$^a$ of FIG. 5. This belt has teeth 80$^a$, 80$^b$ on opposite sides thereof. The teeth 80$^a$ are on the inside where the belt passes around sprockets 66, 72 and 78. The teeth 80$^b$ are on the outside and engaged around sprocket 70. This belt is driven and adjusted in the same manner as chain 68. Belt 68a is arranged in a reentrant configuration like chain 68.

Pulleys 66a, 70a, 72a and 78a may be substituted for the several sprockets as shown in apparatus 20b of FIGS. 6–8. An endless belt 68b having V-ridges 82a, 82b engaged in grooves 83 in the several pulleys may be employed to drive the pulleys.

FIG. 9 shows diagrammatically a mechanical system 20c in which changing the positions of the sprockets 72', 78' with respect to the sprockets 66', 70' to vary the spacing SP between rollers 28' and 36' does not materially change the length of traverse of the endless drive chain or belt 68'. In the diagram of FIG. 9 the mechanical system 20c corresponds to the mechanical systems of apparatus 20, 20a and 20b previously described. The sprocket or pulley 70' is shown slightly smaller in diameter than sprocket or pulley 78' to permit the chain course C1 to run parallel to axis X—X on which lie the centers $O_3$, $O_1$ of the sprockets 70', 78' and the rollers 28', 36' which they drive, corresponding to rollers 28, 36.

The length E of course C1 between centers $O_3$, $O_1$ of sprockets 66', 78' is equal to the length F of course C2 between the centers $O_3$, $O_4$ of the sprockets 70', 72'. Course C2 is parallel to axis X—X and to course C1. Any change $dL$ in length L, the distance between centers $O_1$, $O_3$ results in a change in the length of course C1 equal in magnitude but of opposite algebraic sign to the change in length of course C2, because the sprockets 72', 78' move up or down together while the centers of the sprockets or pulleys 66', 70' remain stationary. Thus, as length E increases, length F decreases by the same amount and vice versa, or stated mathematically:

$$(E+dL)+(F-dL)=E+F=\text{constant}$$

To achieve the same surface velocity of both rollers 28', 36', their diameters must be directly proportional to the diameters of their sprockets or pulleys so that:

$$\frac{D2 \text{ (diameter of roller 36')}}{D4 \text{ (diameter of roller 28')}} = \frac{D1 \text{ (diameter of sprocket 78')}}{D3 \text{ (diameter of sprocket 70')}}$$

The sprockets or pulleys 66' and 72' may be of any desired size and may have equal or unequal diameters.

FIGS. 10 and 11 illustrate graphically the results of employing sprockets or pulleys 70'' and 78'' which have equal diameters in another system 20d. In the diagram of FIG. 10, the mechanical system corresponds to the mechanical systems of apparatus 20, 20a and 20b previously described. In system 20d all sprockets 66'', 70'', 72'' and 78'' are of equal diameter.

In FIG. 10 the centers of the sprockets 70'' and 78'' and the rollers 28'', 36'' lie on axis X'—X'. The chain 68'' may not approach closer than distance S to sprocket 70'' in all positions of movable sprocket 78'' in order to avoid contact between course C1' of the chain and the sprocket 70''. The chain course C1' thus cannot be parallel to axis X'—X'. Course C1' is the variable length of chain between centers Q and P of sprockets 78'' and 66''. Sprocket 66'' is the driving member driven by the motor of the system. Suppose sprocket 66'' is at the intermediate solid line position shown in FIG. 10, where the length $E_0$ of course C1' is equal to the length $F_0$ of course C2'. Course C2' is the variable length of chain between the centers O and R of sprockets 70'' and 72''. Length $F_0$ is the intermediate length of course C2' at the intermediate solid line position of sprocket 72''. The overall length of the chain 68'' is now the shortest and is: $C1'+C2'=PQ+RO=E_0+F_0$, shown as a straight line in FIG. 11.

The chain would have the greatest overall length at extreme raised or lowered dotted line positions of adjustment of sprockets 72'', 78'' and would be equal in both positions to: $E'+F'=E''=F''$ since $E'=F''$ and $E''=F'$, where E' is the longest length of course C1' and E'' is the shortest length of course C1'; F' is the shortest length of course C2' and F'' is the longest length of course C2'. The maximum variation in chain length would be: $(E'+F')-(E+F)$.

As an example of a practical application, of length E were 16 inches, angle $\theta$ between course C1' and axis X—X was 5° and the total adjustment L' of sprockets 72'', 78'' was 4 inches, the maximum change in length of the chain 68'' was not more than 0.01 inch in a chain length of 72 inches.

In system 20d, the sprockets or pulleys 66'', 70'', 72'' and 78'' should all have the same diameters as shown in FIG. 10. Any change in diameter of the sprockets or pulleys 66'' and 72'' in relation to sprockets or pulleys 70'', 72'' increases further the maximum variation in chain length.

In the above discussion of FIGS. 9, 10 and 11, it should be understood that wherever sprockets are referred to, pulleys such as illustrated in FIGS. 6–8 may be substituted instead; and wherever a drive chain is referred to, drive belts such as illustrated in FIGS. 5 and 6 may be substituted instead.

There has thus been provided, according to the invention, a mechanical system in which the spacing between pressure rollers can be varied without materially changing the relative surface speed of rotation of the rollers and without materially changing the overall length of the chain or belt traverse.

In the following claims the term "sprocket member" may be read as "sprocket" or "pulley," and the term "chain member" may be read as a "chain" or "belt."

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A mechanical system of the type described, comprising a frame including a stationary first support and a movable second support, means for adjusting the elevation of the second support with respect to the first support in said frame, first and second spaced sprocket members rotatably carried by said first support, motor means for driving either one of said sprocket members, a third sprocket member rotatably carried by the movable second support and disposed near the first sprocket member, a fourth sprocket member rotatably carried by the movable second support and spaced apart from the first, second and third sprocket members, and an endless chain member with four loops respectively entrained around the four sprocket members, said chain member having a reentrant configuration with one side facing and engaged on only the first sprocket member at one of the loops, and with an opposite side facing and engaged on the other three sprocket members at the other three loops.

2. A mechanical system of the type described, comprising a frame including a stationary first support and a movable second support, means for adjusting the elevation of the second support with respect to the first support in said frame, first and second spaced sprocket members rotatably carried by said first support, motor means for driving either one of said sprocket members, a third sprocket member rotatably carried by the movable second support and disposed near the first sprocket member, a fourth sprocket member rotatably carried by the movable second support and spaced apart from the first, second and third sprocket members, and an endless chain member with four loops respectively entrained around the four sprocket members, said chain member having a reentrant configuration with one side facing and engaged on only the first sprocket member at one of the loops, and with an opposite facing and engaged on the other three sprocket members at the other three loops, said sprocket members having teeth thereon, said chain member being a flexible belt with teeth on opposite sides thereof engaged with the teeth of the sprocket members.

3. A mechanical system of the type described, comprising a frame including a stationary first support and a movable second support, means for adjusting the elevation of the second support with respect to the first support in said frame, first and second spaced sprocket members rotatably carried by said first support, motor means for driving either one of said sprocket members, a third sprocket member rotatably carried by the movable second support and disposed near the first sprocket member, a fourth sprocket member rotatably carried by the movable second support and spaced apart from the first, second and third sprocket members, and an endless chain member with four loops respectively entrained around the four sprocket members, said chain member having a reentrant configuration with one side facing and engaged on only the first sprocket member at one of the loops, and with an opposite side facing and engaged on the other three sprocket members at the other three loops, said sprocket members each being a pulley with a circumferential groove, said chain member being a flexible belt with ridges on opposite sides engaged in the grooves of the pulleys.

4. A mechanical system of the type described, comprising a frame including a stationary first support and a movable second support, means for adjusting the elevation of the second support with respect to the first support in said frame, first and second spaced sprocket members rotatably carried by the first support, a first roller rotatably carried by the first support, said roller being operatively connected to and driven by said first sprocket member, motor means for driving either one of said sprocket members, a third sprocket member rotatably carried by the movable second support and disposed near the first sprocket member, a second roller rotatably carried by the second support, the first and second rollers being disposed axially parallel to each other and spaced a variable lateral distance apart as the second support is moved with respect to the first support, a fourth sprocket member rotatably carried by the second support and spaced from the other three sprocket members, and an endless chain member having four loops respectively entrained around the four sprocket members in a reentrant configuration with one side of the chain member facing and engaged on only the first sprocket member at one of the loops, and with an opposite side facing and engaged on the other three sprocket members at the other three loops, whereby movement of said second support with respect to the first support simultaneously moves the third and fourth sprocket members and the second roller to change the lateral spacing of the second roller from the first roller, while the overall length of the chain member remains substantially unchanged and the relative speed of surface travel of the first and second rollers remains substantially constant.

5. A mechanical system according to claim 4, wherein said chain member is an assemblage of links engaged on teeth of the sprocket members.

6. A mechanical system according to claim 4, wherein said chain member is a flexible belt having teeth on opposite sides thereof engaged on teeth of the sprocket members.

7. A mechanical system according to claim 4, wherein said chain member is an endless belt having ridges on opposite sides, and said sprocket members are pulleys with grooves receiving said ridges.

8. A mechanical system according to claim 4, wherein the chain member is an assemblage of interengaged links meshed with teeth of the sprocket members.

References Cited by the Examiner

UNITED STATES PATENTS

| | | | |
|---|---|---|---|
| 96,718 | 11/1869 | Meriam | 74—219 X |
| 1,575,655 | 3/1926 | Stinson | 74—242.1 X |
| 2,010,056 | 8/1935 | Brush | 74—242.1 |
| 2,193,936 | 3/1940 | Ostand et al. | 74—242.1 X |
| 2,212,348 | 8/1940 | Lundington | 74—242.8 |
| 2,629,931 | 3/1953 | Brierley | 74—219 X |
| 3,140,620 | 7/1964 | Ferara | 74—221 |

DAVID J. WILLIAMOWSKY, *Primary Examiner.*

DON A. WAITE, *Examiner.*

J. A. WONG, *Assistant Examiner.*